Dec. 26, 1961  G. A. SCOTT  3,014,872
FIBROUS INSULATION
Filed Oct. 26, 1959

INVENTOR
GEORGE A. SCOTT
BY Richard L. Caslin
HIS ATTORNEY

United States Patent Office 3,014,872
Patented Dec. 26, 1961

3,014,872
FIBROUS INSULATION
George A. Scott, Jeffersontown, Ky., assignor to General Electric Company, a corporation of New York
Filed Oct. 26, 1959, Ser. No. 848,701
3 Claims. (Cl. 252—62)

The present invention relates to an improvement in heat insulating material particularly fibrous insulations such as fiber glass or mineral wool.

All glass and mineral fiber insulations currently on the market have a marked increase in thermal conductivity or "K" factor with increased temperature due to their transmission of radiant heat energy. Accordingly, I propose to improve the thermal characteristics of the installation by reducing the transmittance of radiant energy through the material. It is to be understood that this improvement in the insulation is to be obtained without increasing the cost of the material appreciably, without making it toxic and without increasing the volume of the material for a given application.

The principal object of the present invention is to improve the thermal characteristics of loosely matted fibrous insulations by adding a substance that will tend to absorb the radiant heat energy in the area below a wave length of approximately three microns.

A further object of the present invention is to decrease the net radiation of infrared energy through a body of fibrous insulation so as to reduce the total conductivity through the insulation in the high temperature ranges.

The present invention is embodied in a loosely matted fibrous heat insulator such as fiber glass or mineral wool. Blown into this material is a powdered substance such as silicon, germanium, carbon black or fibrous potassium titanate. Although all of these materials have been found satisfactory the powdered silicon is the preferred embodiment of the present invention. The silicon is added to the fibrous insulation in an amount between 20% to 50% by weight of the insulation. These additives serve as a good radiant energy absorber as they are essentially opaque to infrared energy and they reduce the transmission of radiation through the mixture. It is important that the radiant energy absorber be divided into fine particles and that each particle will have a poor thermal contact with the fibers so as not to increase the thermal losses due only to conduction. Also, it is important that the particles be dispersed uniformly throughout the fibrous material so that the particles are not concentrated in small areas leaving other areas transparent to radiant energy.

My invention will be better understood from the following description taken in connection with the accompanying drawing and its scope will be pointed out in the appended claims.

Figure 1:
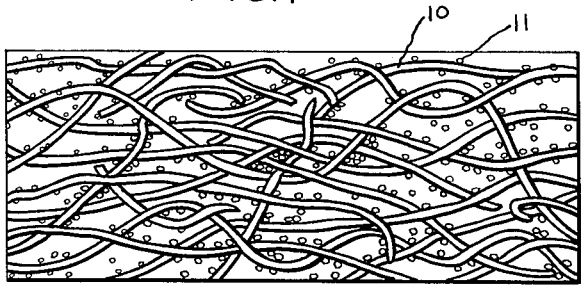
FIG. 1 is a pictorial representation on a greatly enlarged scale of a specimen of loosely matter fibrous material having dispersed therein a powdered substance serving as a radiant energy absorber according to the present invention.

Turning now to a consideration of the drawings and in particular to FIG. 1, the invention is illustrated pictorially in a greatly enlarged view showing the long thin fibers 10 of the insulation which resemble the appearance of raw cotton. Interspersed within the fibrous insulation is a powdered substance 11 such as silicon that adheres lightly to the fibers as by electrostatic attraction and is used because of its ability to absorb the radiant energy thereby reducing the conductivity of the composite material. Since this invention increases the efficiency of the insulation thinner batts of insulation may be used to gain equal results with the material previously used, or higher temperatures may be reached without increasing the standard thickness of insulation.

Figure 2:
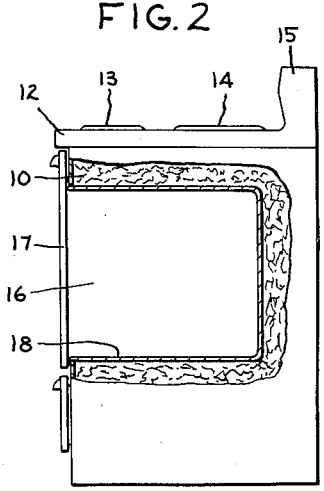
FIG. 2 is a side elevational view partly in cross section of an electric range showing the insulation of the present invention surrounding the oven liner.

This invention was conceived during the development of an improved electric range and the invention is scheduled for use as the insulation surrounding the oven of the range. This is illustrated in FIG. 2 showing a side elevational view of an electric range 12 with surface heating units 13 and 14 mounted on the top surface of the range. A backsplasher 15 of standard design is formed across the back of the range for mounting the control devices for the surface units and oven thereon. The oven is represented as element 16 and it is closed in the conventional manner by a horizontally pivoted oven door 17 that swings down from the bottom wall of the oven liner 18. The improved thermal insulation 10 of the present invention is shown surrounding the liner 18 of the oven for retaining the high temperatures that are reached within the oven.

Figure 3:
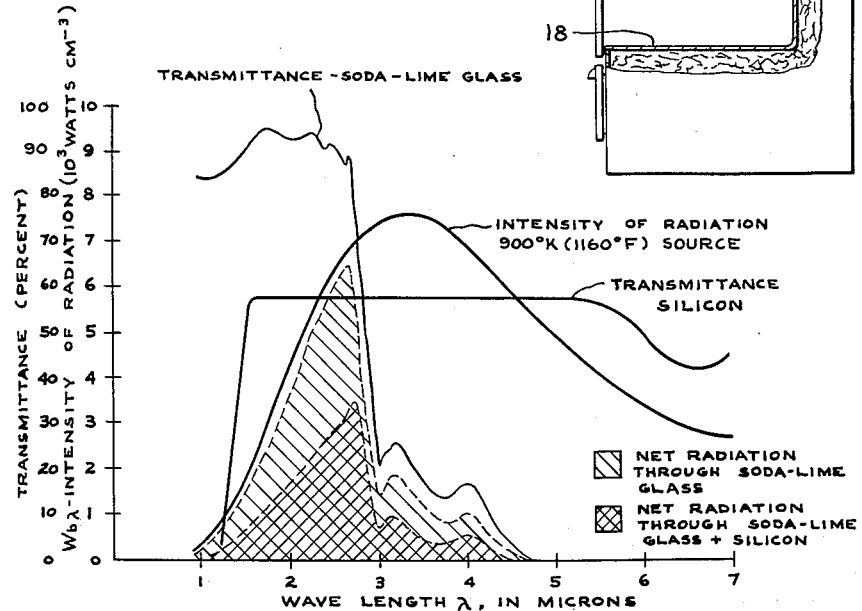
FIG. 3 is a graph illustrating five curves namely; (1) the transmittance of fiber glass insulation, (2) the transmittance of silicon, (3) the intensity of radiation of the heat source, (4) the net radiation through the fiber glass material, and finally (5) the net radiation through the fiber glass with a silicon material added thereto.

A possible explanation for the improvement in thermal insulating properties of fiber glass caused by the addition of powdered silicon may be found in the graph of FIG. 3. The transmittance or fraction of the total energy transmitted through the fiber glass insulation is high up to approximately 2.75 microns. The transmittance through silicon starts at about 1.2 microns, and at its peak reaches only about 54%. This is to be compared with the 90% transmittance for the soda-lime glass from 1.5 to 2.75 microns. Superimposed on this graph is the intensity of the source of radiation which is figured as 1160° F. This is about the maximum hot face temperature which might be encountered in standard range operations. By multiplying the transmittance times the intensity of radiation, it is possible to compute the net radiation through the soda-lime glass fibers, as is indicated by the area bounded by the single cross-hatching. Using the same method of computation, it is possible to compute the net radiation through a composite material of glass and silicon as is indicated by the smaller area bounded by the double cross-hatching. Since the net radiation transmitted through the composite of glass and silicon is less than that through the glass alone, the portion of heat transferred due to radiation through the insulation is decreased thereby resulting in lower total thermal transmittance. The end result is an improved insulation. As a matter of information the intensity of radiation is calculated according to Planck's law of monochromatic radiation of a black body where $W_{b\lambda}$ is the intensity of radiation from a black body for any given wave length $\lambda$ while the units of measure are $10^3$ watts cm.$^{-3}$.

The transmittance figures on the graph are based on flat sheets of glass and silicon, but the mechanism of heat transfer would be of the same nature through small particles of the materials. The above is probably only a partial explanation of the affect of powdered silicon powder but at the present time it is the only explanation which appears satisfactory.

Figure 4:
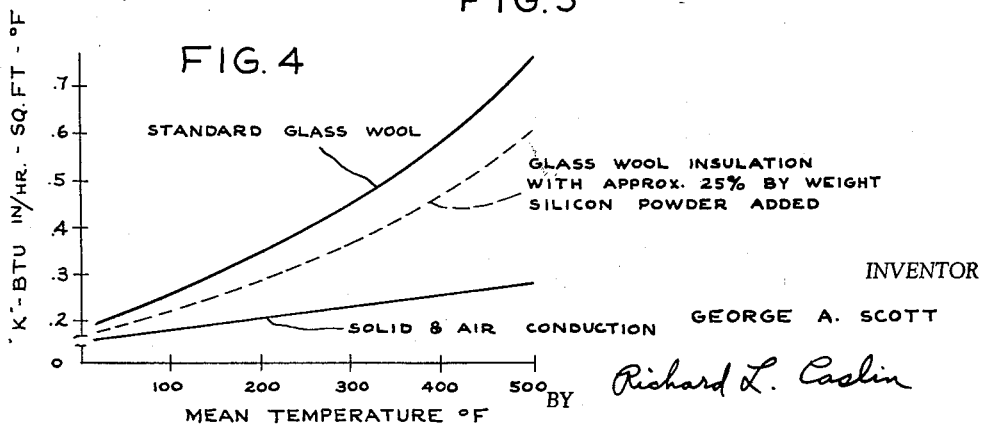
FIG. 4 is a graph showing the comparison of the conductivity of standard fiber glass insulation and the relative lower conductivity of fiber glass material carrying approximately 25% by weight of silicon powder.

FIG. 4 of the drawing shows a graph of the conductivity plotted against the mean temperature showing the relative value of conductivity of standard fiber glass insulation as compared with the relatively lower values using a composite insulation of fiber glass carrying a charge of silicon powder.

While the powdered silicon is the preferred additive contemplated by this invention there are other alternatives which have proven satisfactory in the laboratory such as powdered germanium, carbon black particles, and fibrous non-toxic potassium titanate.

Modifications of this invention will occur to those skilled in this art and it is to be understood, therefore, that this invention is not limited to the particular embodiments disclosed but that it is intended to cover all modifications which are within the true spirit and scope of this invention as claimed.

What I claim as new and desire to secure by Letters Patent of the United States is:

1. A flexible heat insulating body consisting essentially of loosely matted fibrous insulating material, the insulation having dispersed therein a finely divided substance that is opaque to infrared energy to have the characteristics of a radiant energy absorber below a wave length of approximately three microns, wherein the finely divided substance is selected from a group consisting of powdered silicon, powdered germanium, carbon black particles, and fibrous potassium titanate, the finely divided substance also being in poor mechanical and thermal contact with the fibrous insulation and being present in an amount between 20% and 50% by weight of the fibrous material.

2. A flexible heat insulating body consisting essentially of loosely matted fibrous insulating material having dispersed therein a finely divided substance that is opaque to infrared energy to serve as a radiant energy absorber below a wave length of approximately three microns, wherein the fibrous insulation is selected from a group consisting of fiberglass and mineral wool, and the finely divided substance is selected from the group consisting of powdered silicon, powdered germanium, carbon black particles and fibrous potassium titanate, said finely divided substance being present in an amount between 20% and 50% by weight of the fibrous material.

3. A flexible heat insulating body as recited in claim 2 wherein the finely divided substance is in poor thermal contact with the fibers of the material so as to decrease the thermal losses due to conduction.

References Cited in the file of this patent

UNITED STATES PATENTS

| | | |
|---|---|---|
| 2,005,356 | Toohey et al. | June 18, 1935 |
| 2,175,630 | Kiesel | Oct. 10, 1939 |
| 2,633,433 | Hollenberg | Mar. 31, 1953 |
| 2,634,207 | Miscall et al. | Apr. 7, 1953 |
| 2,811,457 | Speil et al. | Oct. 29, 1957 |
| 2,833,620 | Gier et al. | May 6, 1958 |
| 2,841,470 | Berry | July 1, 1958 |

FOREIGN PATENTS

| | | |
|---|---|---|
| 199,624 | Austria | Sept. 25, 1958 |